(12) United States Patent
Ban et al.

(10) Patent No.: US 8,350,913 B2
(45) Date of Patent: Jan. 8, 2013

(54) CALIBRATING DEVICE FOR CALIBRATION AND IMAGE MEASUREMENT SYSTEM COMPRISING CALIBRATING DEVICE

(75) Inventors: Kazunori Ban, Minamitsuru-gun (JP); Katsutoshi Takizawa, Minamitsuru-gun (JP); Gang Shen, Minamitsuru-gun (JP); Keisuke Watanabe, Minamitsuru-gun (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 430 days.

(21) Appl. No.: 12/631,094

(22) Filed: Dec. 4, 2009

(65) Prior Publication Data

US 2010/0141776 A1 Jun. 10, 2010

(30) Foreign Application Priority Data

Dec. 10, 2008 (JP) .................................. 2008-314897

(51) Int. Cl.
*H04N 17/00* (2006.01)

(52) U.S. Cl. ........................................ 348/187; 348/189

(58) Field of Classification Search .................. 348/187, 348/189; *H04N 17/00*
See application file for complete search history.

(56) References Cited

U.S. PATENT DOCUMENTS

| | | | |
|---|---|---|---|
| 5,570,190 A | 10/1996 | Terawaki et al. | |
| 6,114,824 A * | 9/2000 | Watanabe ................. | 318/568.12 |
| 7,161,321 B2 | 1/2007 | Ban et al. | |
| 7,532,949 B2 | 5/2009 | Ban et al. | |
| 2008/0004750 A1 | 1/2008 | Ban et al. | |
| 2011/0185458 A1* | 7/2011 | Kysar et al. ..................... | 850/19 |

FOREIGN PATENT DOCUMENTS

| | | | |
|---|---|---|---|
| JP | 08-086613 | | 4/1996 |
| JP | 10-104033 | * | 4/1998 |
| JP | 3394278 | | 1/2003 |
| JP | 3409931 | | 3/2003 |

(Continued)

OTHER PUBLICATIONS

Roger Y. Tsai, "An Efficient and Accurate Camera Calibration Technique for 3D Machine Vision," Proceedings of IEEE Conference on Computer Vision and Pattern Recognition, 1986, Miami Beach, Florida, pp. 364-374.

(Continued)

*Primary Examiner* — Trang U Tran
(74) *Attorney, Agent, or Firm* — Drinker Biddle & Reath LLP (57) ABSTRACT

A calibrating device for calibration of an image measurement system. The calibrating device includes a main body having an upper surface, and a characteristic portion, which serves as a benchmark for calibration and is in the form of a recess formed in the upper surface of the main body, wherein the characteristic portion includes a side surface extending in a direction crossing the upper surface, and a bottom surface extending in a direction crossing the side surface, the bottom surface has an optical reflectance lower than an optical reflectance of the upper surface in relation to light identical to each other. This can provide a calibrating device for calibration of an image measurement system, which can detect the characteristic portion on the calibrating device stably, precisely and independent of the illumination conditions, which is less costly and can be easily handled.

6 Claims, 8 Drawing Sheets

FOREIGN PATENT DOCUMENTS

| | | |
|---|---|---|
| JP | 3477139 | 9/2003 |
| JP | 3512092 | 1/2004 |
| JP | 3575165 | 7/2004 |
| JP | 2005-300230 | 10/2005 |
| JP | 3737919 | 11/2005 |
| JP | 4021413 | 10/2007 |
| JP | 2008-12604 | 1/2008 |

OTHER PUBLICATIONS

Japanese Notice of Reasons for Rejection mailed Apr. 20, 2010 issued in Japanese Application No. 2008-314897 (including a partial translation thereof).

* cited by examiner

CALIBRATING DEVICE FOR CALIBRATION AND IMAGE MEASUREMENT SYSTEM COMPRISING CALIBRATING DEVICE

This application claims priority under 35 U.S.C. §119 and/or §365 to Japanese Application No. 2008-314897, filed Dec. 10, 2008, the entire contents of which are incorporated herein by reference.

BACKGROUND OF THE INVENTION

1. Field of the Invention

The present invention relates to a calibrating device for calibration of an image measurement system using a camera. Specifically, the present invention relates to a calibrating device imaged by a camera for calibrating the internal parameters of the camera, mechanical parameters of a robot, etc., and an image measurement system comprising the calibrating device.

2. Description of the Related Art

Conventionally, an image measurement system using a camera is utilized in various industrial field. In such an image measurement system, an object is imaged by a camera, the image is subjected to image processing by an image processing apparatus, etc., and the position, shape, size, and angle of the object are measured. Further, in order to use a camera for measurement, an operator must calibrate (correction) the camera using a calibrating device prior to the measurement. Usually, in an image measurement system, the characteristic portion (including arbitrary graphics and patterns, the same below) provided on the calibrating device is imaged by a camera, the outline, position, etc., of the characteristic portion is detected from the picked-up measurement image, and calibration is performed based on the detection result. As a conventional calibration technology, for example, non-patent document "Roger Y. Tsai, "An Efficient and Accurate Camera Calibration Technique for 3D Machine Vision", Proceedings of IEEE Conference on Computer Vision and Pattern Recognition, Miami Beach, Fla., 1986, pages 364-374" discloses a method for calibrating internal parameters (lens focal distance, lens distortion, lens center, etc., of a camera) of a camera using a calibrating device. Further, Japanese Patent No. 3394278 discloses a method for setting a sensor coordinate system of a visual sensor including a camera using a calibrating device.

However, recently, an image measurement system using a camera has also been used for a measurement apparatus for calibrating a robot system. For example, Japanese Unexamined Patent Publication (Kokai) No. 2008-12604 discloses a measurement apparatus for calibrating mechanical parameters of a robot using a camera. Japanese Patent No. 4021413 discloses a measurement apparatus for measuring a to-be-measured target using a light receiving device (camera) mounted near the tip of a robot arm. Japanese Unexamined Patent Publication (Kokai) No. 2005-300230 discloses a measurement apparatus for measuring the position of TCP (Tool Center Point) of a robot using a camera.

When calibration is performed using a camera as mentioned above, accuracy of the shape or the position of the characteristic portion provided on the calibrating device, and the robustness of the illumination conditions have direct influence on the calibration results. For example, as disclosed in Japanese Unexamined Patent Publication (Kokai) No. 2005-300230, in order to accurately measure the position of the Tool Center Point, a mark, which is a characteristic portion, must be accurately arranged or formed on the Tool Center Point of the robot and the base of the tool.

Conventionally, the characteristic portion was formed by printing or applying a colored paint to the calibrating device. However, it was difficult to accurately print or apply color paint to the calibrating device. Further, when the characteristic portion is formed by applying colored paint, the surface of the paint may be smooth depending on the forming method, and the characteristic portion reflects the outside light, and thus, the image measurement system cannot stably detect the characteristic portion. Also, the paint may be altered by temperature or may be melted by an organic solvent, and further, there are various limitations in the use of the paint in some places. Therefore, when the characteristic portion is formed by paint, such limitations in the use of the paint must be taken into consideration.

Thus, various calibrating devices have been developed in order to precisely arrange or form the characteristic portion on the calibrating device. For example, Japanese Patent No. 3409931 discloses a magnification calibration plate comprising a transparent substrate such as glass, etc., on which a deposition material, such as chrome, is vapor-deposited as a pattern which serves as a characteristic portion. Japanese Patent No. 3477139 discloses a calibration gauge comprising a metal plate on which a line segment which serves as a characteristic portion is drawn with colored ink. Japanese Patent No. 3512092 discloses a calibration apparatus wherein a design having a predetermined pattern which serves as a characteristic portion is displayed using a liquid crystal panel. Japanese Patent No. 3575165 discloses a calibrating device provided with a positioning member having a recess and a completely spherical mark body which is held in the recess of the positioning member. Japanese Patent No. 3737919 discloses a photogrammetric target comprising a plurality of reflective sheets imaged at a relatively high brilliance and adhered on the measurement portion, and non-reflective sheets provided around the reflective sheets.

However, the above-mentioned conventional methods have the following drawbacks. In the case of the magnification calibration plate disclosed in Japanese Patent No. 3409931, it is difficult to accurately vapor-deposit deposition materials such as chrome. Also, in the case of the calibration gauge disclosed in Japanese Patent No. 3477139, it is difficult to accurately draw the line segment on the metal plate with colored ink. In addition, similar to applying paint, the surface of the colored ink may be smooth and reflect outside light. Therefore, there is a problem that depending on illumination conditions, the characteristic portion cannot be distinguished from the surroundings due to the reflected light, and thus, the image measurement system cannot stably detect the characteristic portion.

The calibration apparatus disclosed in Japanese Patent No. 3512092 has a problem that an expensive liquid crystal panel is required, which leads to an increase in production costs. In the calibrating device disclosed in Japanese Patent No. 3575165, there is a problem that the spherical mark which serves as a characteristic portion must be produced with accuracy, which leads to an increase in the production costs. In the photogrammetric target disclosed in Japanese Patent No. 3737919, it is difficult to accurately adhere the plurality of reflective sheets.

SUMMARY OF THE INVENTION

An object of the present invention is to provide a calibrating device for calibration in an image measurement system which enables stable detection of a characteristic portion of the calibrating device and precisely independent of the illumination conditions, and is less costly and easily handled.

In order to attain the above object, an embodiment of the present invention provides a calibrating device for calibration in an image measurement system comprising a main body having an upper surface; and a characteristic portion which serves as a benchmark for calibration and is in the form of a recess formed in the upper surface of the main body; wherein the characteristic portion comprises a side surface extending in a direction crossing the upper surface, and a bottom surface extending in a direction crossing the side surface; and wherein the bottom surface has an optical reflectance lower than an optical reflectance of the upper surface in relation to light identical to each other.

The main body comprises a lower surface opposite to the upper surface; wherein the characteristic portion comprises a through hole formed in the main body to open at both the upper surface and the lower surface, and a closing member separate from the main body and attached to the lower surface to close one of openings of the through hole; and wherein an inner peripheral surface of the through hole defines the side surface and a surface of the closing member defines the bottom surface.

The characteristic portion comprises a bottomed recess formed in the main body, and a bottom member separate from the main body and arranged in the bottomed recess; and wherein an inner peripheral surface of the bottomed recess defines the side surface and a surface of the bottom member defines the bottom surface.

The upper surface of the main body is provided with a flat portion at least in a region adjacent to the characteristic portion; wherein the side surface of the characteristic portion extends in a direction perpendicular to the flat portion of the upper surface; and wherein the bottom surface of the characteristic portion extends in a direction perpendicular to the side surface.

The upper surface of the main body is provided with a flat portion at least in a region adjacent to the characteristic portion; and wherein the characteristic portion is shaped so that an opening area in a cross section parallel to the flat portion of the upper surface increases from the upper surface toward the bottom surface.

Another embodiment of the present invention provides an image measurement system comprising a camera and the above-mentioned calibrating device for calibration imaged by the camera.

The shape and size of the characteristic portion of the calibrating device, and an angle of an optical axis of the camera predetermined with respect to the characteristic portion for calibration, are set so as not to image the side surface when the camera images the characteristic portion.

In another embodiment, the shape and size of the characteristic portion of the calibrating device, and an angle of an optical axis of the camera predetermined with respect to the characteristic portion for calibration, are set so as not to image the bottom surface when the camera images the characteristic portion.

BRIEF DESCRIPTION OF THE DRAWINGS

These objects, features and advantages, as well as other objects, features and advantages of the present invention will become further obvious by the detailed explanation of typical embodiments of the present invention shown in the attached drawings.

DETAILED DESCRIPTION (First Embodiment)

Hereinafter, a first embodiment of the present invention will be explained with reference to the attached drawings. In the drawings below, the same reference numeral is used for the same member. The scales of these drawings have been appropriately changed for easy understanding.

Figure 1A:
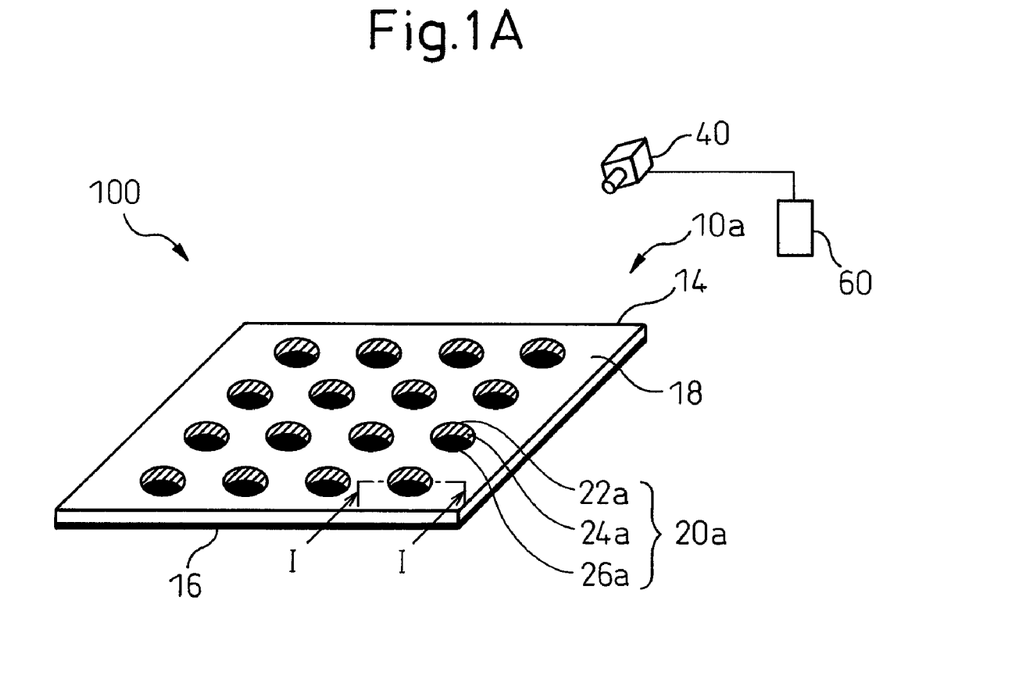
FIG. 1A is a perspective view of an image measurement system provided with a calibrating device according to the present invention and a camera for imaging the calibrating device.
Figure 1B:
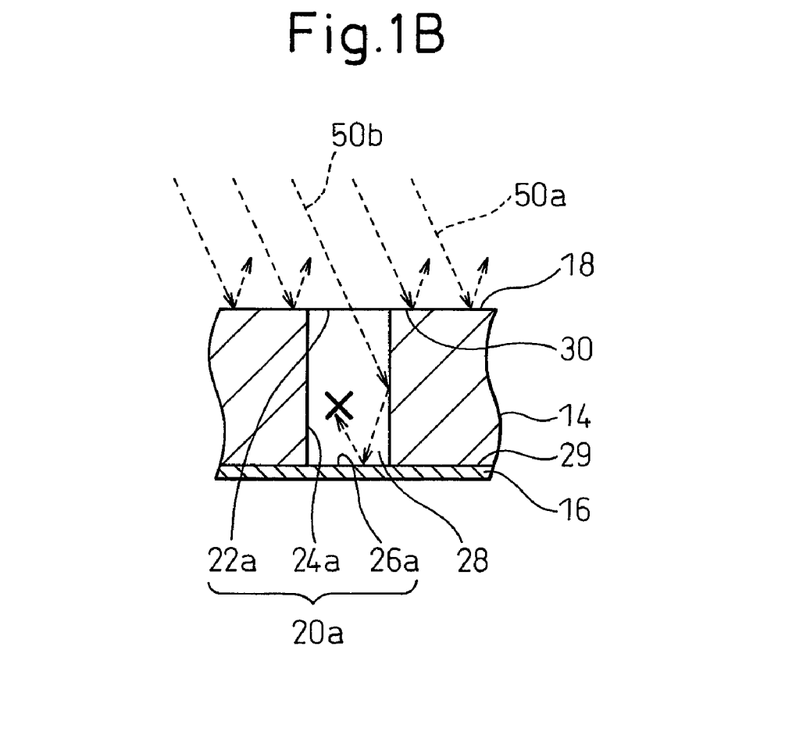
FIG. 1B is a cross sectional view along the line I-I of FIG. 1A showing a characteristic portion on the calibrating device.

FIG. 1A is a perspective view showing an image measurement system 100 comprising a calibrating device 10a of the first embodiment and a camera 40 for imaging the calibrating device 10a. FIG. 1B is a cross sectional view along the line I-I of FIG. 1A showing a characteristic portion 20a of the calibrating device 10a.

First, with reference to FIG. 1A, the image measurement system 100 using the camera 40 will be explained. The image measurement system 100 is configured by the calibrating device 10a provided with the characteristic portion 20a in the form of a recess, the camera 40 for imaging the calibrating device 10a, and an image processing section 60 connected to the camera 40 to process the measurement image picked-up by the camera 40 and detect the characteristic portion 20a.

The camera 40 of the image measurement system 100 is a CCD camera, and the camera 40 has a function of detecting a two-dimensional image by a light-receiving surface (on the CCD array surface) by imaging. The camera 40 outputs the imaged two-dimensional image to the image processing section 60 as a measurement image. Also, the camera 40 is arranged at a position capable of imaging the calibrating device 10a, supported by, for example, a tip of robot, wall, ceiling, or the like, and secured. The camera 40 is arranged so that its imaging direction is opposed to the characteristic portion 20a of the calibrating device 10a, enabling the imaging of the characteristic portion 20a. Further, the camera 40 can image the characteristic portion 20a not only from just above but also from the oblique direction.

The image processing section 60 is connected to the camera 40 by a wireline connection, and arranged outside of the camera 40. The image processing section 60 processes the measurement image of the characteristic portion 20a picked-up by the camera 40, and detects position, shape, etc., of the characteristic portion 20a based on the processing results. Using the detected characteristic portion as a benchmark, an operator of the image measurement system performs the calibration of the internal parameters of the camera, the mechanical parameters of the robot, and the like. The method for calibration using the characteristic portion as a benchmark is the same as the conventional method, and thus, explanation thereof is omitted. Also, the image processing section 60 can be a conventional one provided with a CPU, a data memory, an interface, etc., and thus, detailed explanation thereof is omitted.

Next, the calibrating device 10a according to the first embodiment will be explained. As shown in FIG. 1A and FIG. 1B, the calibrating device 10a is composed by a plate 14 (main body) having an upper surface 18, and a sheet 16 (closing member) attached to a lower surface 29 opposite to the upper surface 18, the sheet being a separate member from the plate 14 and made of a low reflective material having a reflectance lower than the reflectance of the upper surface of the plate 14. Also, the plurality of characteristic portions 20a in the form of recesses are formed in the upper surface 18 of the plate 14, and each characteristic portion 20a has an opening 22a having a predetermined shape. For example, each characteristic portion 20a of the calibrating device 10a shown in FIG. 1A has a circular opening 22a, and the characteristic portions 20a are lined four deep, four wide, to form a combined design as a whole. The shape of the opening 22a of the characteristic portion 20a should not be limited to a circle, but can be a triangle figure, a rectangle figure, or a combined design of the figures.

Next, the structure of the characteristic portion 20a will be explained. As shown in FIG. 1B, each characteristic portion 20a of the calibrating device 10a according to the first embodiment is composed of a through hole 28 which is formed on the plate 14 to open into both the upper surface 18 and the lower surface 29 of the plate 14, and the sheet 16 which closes the opening of the through hole 28 at the lower surface side. Namely, the opening of the through hole 28 at upper surface side corresponds to an opening 22a of the characteristic portion 20a, and the inner peripheral surface of the through hole 28 corresponds to a side surface 24a of the characteristic portion 20a. The surface of the sheet 16 exposed by the through hole 28 corresponds to a bottom surface 26a of the characteristic portion 20a. The bottom surface 26a is formed by the sheet 16 made of a low reflective material, and thus, the reflectance of the bottom surface 26a is lower than the optical reflectance of the upper surface 18 of the plate 14. In the first embodiment, the sheet 16 is produced by cutting black sponge in a sheet form.

Also, as shown in FIG. 1B, the upper surface 18 of the plate 14 has a flat portion 30 in a region adjacent to the characteristic portion 20a, and the side surface 24a of the characteristic portion 20a extends in a direction perpendicular to the flat portion 30 of the upper surface 18. Further, the bottom surface 26a of the characteristic portion 20a extends in a direction perpendicular to the side surface 24a.

Figure 2A:
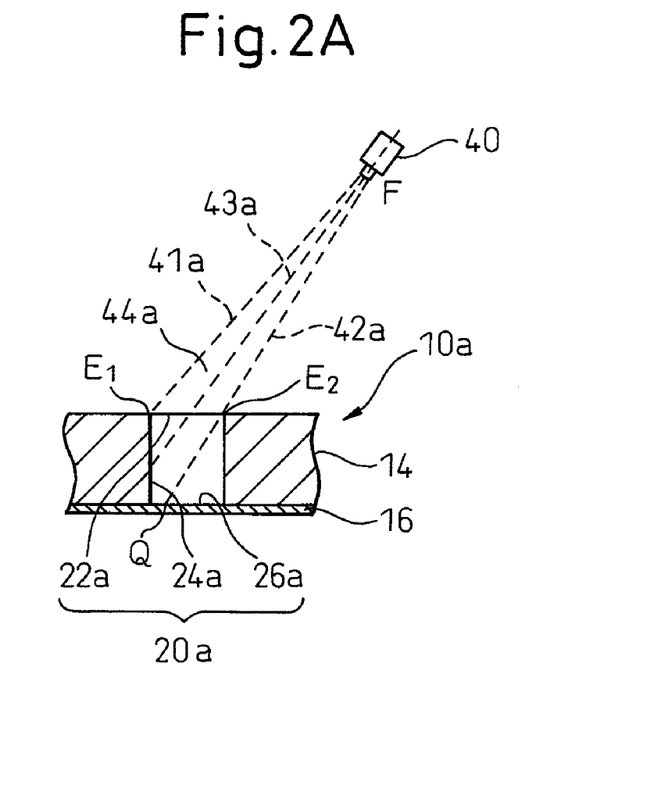
FIG. 2A is a cross sectional view showing a positional relationship between the calibrating device according to the first embodiment and the camera for imaging the calibrating device.
Figure 2B:
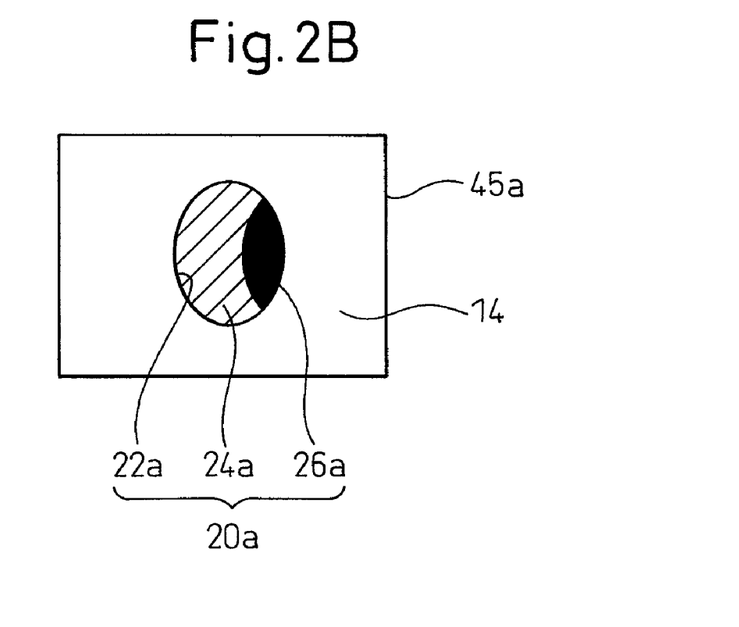
FIG. 2B is a view showing a part of the measurement image of the calibrating device imaged by the camera.

Next, a method for detecting the characteristic portion 20a will be explained using FIG. 1B to FIG. 2B. FIG. 2A is a cross sectional view showing a positional relationship between the calibrating device 10a according to the first embodiment and the camera 40 which images the calibrating device 10a. FIG. 2B is a view showing a part of the measurement image 45a of the calibrating device 10a picked-up by the camera 40.

First, the feature that the brilliance of the characteristic portion 20a is lower than the brilliance of the surrounding upper surface 18 of the plate 14 will be explained. As shown in FIG. 1B, the outside light 50a incident from the outside of the calibrating device 10a is reflected by the upper surface 18 of the plate 14. On the other hand, the outside light 50b incident from the opening 22a to the inside of the characteristic portion 20a is reflected by the side surface 24a, and is incident to the bottom surface 26a. Under ordinary circumstances, the outside light 50b is reflected by the bottom surface 26a, however, because the bottom surface 26a is the sheet 16 made of a low reflective material, the outside light 50b incident to the bottom surface 26a is barely reflected. Accordingly, the amount of light reflected from the bottom surface 26 decreases, and as a result, the brilliance of the bottom surface 26 is lower than the brilliance of the upper surface 18 of the plate 14.

Further, because the bottom surface 26a barely reflects light, the amount of light reflected to the outside by side surface 24a also decreases. Therefore, the brilliance of the side surface 24a is also lower than the brilliance of the upper surface 18 of the plate 14. In this regard, however, the brilliance of the side surface 24a is increased by the diffusion light from the upper surface 18 of the plate 14 and the opposing side surface, and thus, the brilliance of the side surface 24a does not become as low as the brilliance of the bottom surface 26a. Since the bottom surface 26a and the side surface 24a have low brilliance, the brilliance of the characteristic portion 20a (inside of the opening 22a) becomes lower than the brilliance of the surrounding upper surface 18 of the plate 14. Namely, the characteristic portion 20 is imaged dark compared to the upper surface 18 of the plate 14.

Next, a specific example of the measurement image picked-up by the camera 40 will be explained using FIG. 2A and FIG. 2B. As shown in FIG. 2A, the camera 40 is located obliquely above the characteristic portion 20a. Therefore, as shown in FIG. 2B, in the measurement image 45a picked-up by the camera 40, the opening 22a of the characteristic portion 20a is recorded as an ellipse shape. Further, the camera 40 images the inside of the characteristic portion 20a through the opening 22a. Therefore, as shown in FIG. 2A, the inside of the characteristic portion 20a imaged by the camera 40 is defined by the inside of the characteristic portion 20a included in the range surrounded by the distal side line-of-sight 41a and the proximal side line-of-sight 42a (inner-characteristic-portion imaging range 44a). Note that, the distal side line-of-sight 41a is a line-of-sight of the camera 40 connecting the position F of the camera 40 and the point E1 on the opening 22a far from the position F of the camera 40, and is indicated by the dashed line FE1 in FIG. 2A. The proximal side line-of-sight 42a is defined by the line-of-sight of the camera 40 connecting the position F of the camera 40 and the point E2 on the opening 22a closer to the camera 40 than the point E1 and an extension of the line, and is indicated by the dashed line FQ in FIG. 2A.

As shown in FIG. 2A, the inner-characteristic-portion imaging range 44a includes a part of the side surface 24a and a part of the bottom surface 26a. Therefore, when the camera 40 images the characteristic portion 20a, the brilliance indicating the side surface 24a and the brilliance indicating the bottom surface 26a are recorded in the measurement image 45a within the range outlined by the opening 22a. The image processing section 60 of the image measurement system 100 can detect the position, outline, etc., of the characteristic portion 20a by processing the measurement image 45a based on two different brilliances.

Further, because the characteristic portion 20a is in the form of a recess, a great deal of the light incident to the bottom surface 26a of the characteristic portion 20a is the light reflected by the side surface 24a. Except for the case that the light is incident from the direction perpendicular to the plate 14, the side surface 24a of the characteristic portion 20a serves as an impediment, and thus, a small amount of light is directly incident on the bottom surface 26a. Therefore, it is rare that the brilliance of the bottom 26a increases due to the glare generated by the direct light. In this way, the characteristic portion 20a has a structure which barely reflects light, and the low brilliance of the characteristic portion 20a can be maintained. Therefore, the image measurement system 100 can stably detect the characteristic portion 20a independent of the illumination conditions.

By the calibrating device 10a according to the first embodiment, the reflectance of the bottom surface 26a of characteristic portion 20a in the form of a recess is low, and thus, the light incident to the characteristic portion 20a is barely reflected to the outside of the characteristic portion 20a. Because the amount of light reflected from the bottom surface 26a decreases, the brilliance of the bottom surface 26a becomes lower than the brilliance of the upper surface 18 of the plate 14. Because the bottom surface 26a barely reflects light, the amount of light reflected to the outside by the side surface 24a also decreases. Therefore, the brilliance of the characteristic portion 20a becomes lower than the brilliance of the upper surface 18 of the plate 14. In addition, because the characteristic portion 20a is in the form of a recess, except for the case that the light is incident from the direction perpendicular to the plate 14, the side surface 24a of the characteristic portion 20a serves as an impediment, and thus, a small amount of light is directly incident on the bottom surface 26a. Therefore, it is rare that the brilliance of the bottom 26a increases due to the glare generated by the direct light. In this way, the characteristic portion 20a has a structure which barely reflects light, and the low brilliance of the characteristic portion 20a can be maintained. Therefore, the image measurement system 100 can stably detect the characteristic portion 20a independent of the illumination conditions. If a paint is used as in the prior art, the outline may be indefinite because of the reflection of light. However, in the present invention, the characteristic portion is detected by the difference of the brilliances, and thus, the outline of the characteristic portion 20a cannot be indefinite because of the reflection. Accordingly, the image measurement system 100 can precisely detect the characteristic portion 20a. Also, unlike the prior arts, a paint is not used, and thus, there is no restriction in the use of the calibrating device 10a, and the handling become easier. Further, the upper surface 18 of the main body of the calibrating device 10a and the side surface 24a of the characteristic portion 20a can be formed by the same material, and can be applied with the same surface treatment. Furthermore, the characteristic portion 20a can be formed easily and precisely by engraving the upper surface 18 of the plate 14 by machining, and thus, for example, an expensive liquid crystal panel of the calibration apparatus described in Japanese Patent No. 3512092 is not required. Therefore, the calibrating device 10a can be produced at a low processing cost.

Figure 8A:
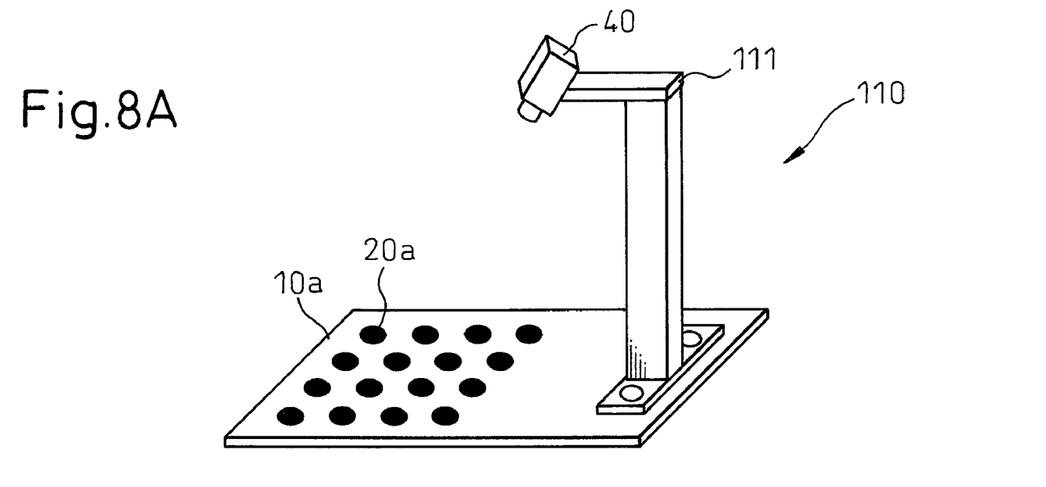
FIG. 8A is a perspective view showing a camera system to which the calibrating device is attached.
Figure 8B:
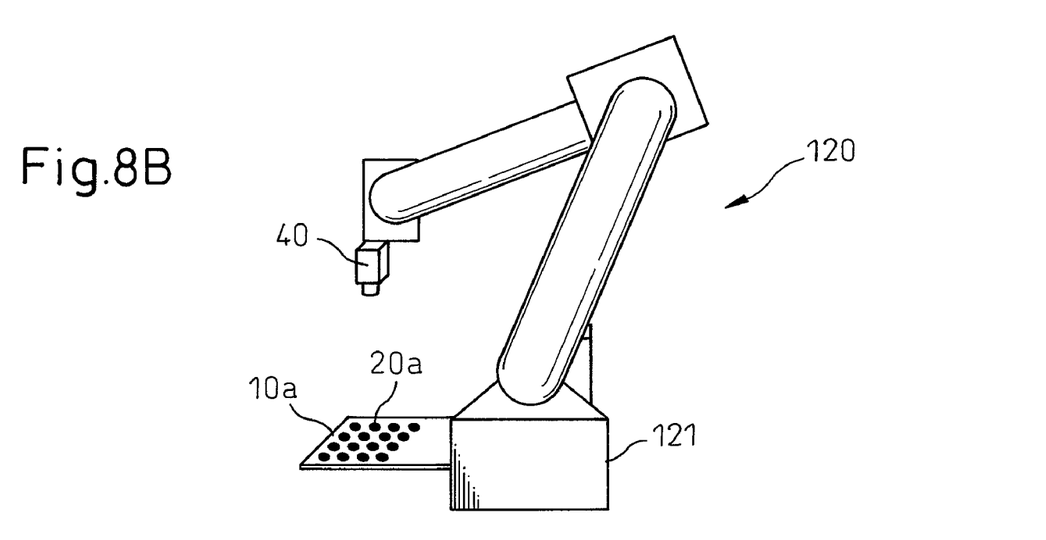
FIG. 8B is a perspective view showing a robot to which the calibrating device is attached.
Figure 8C:
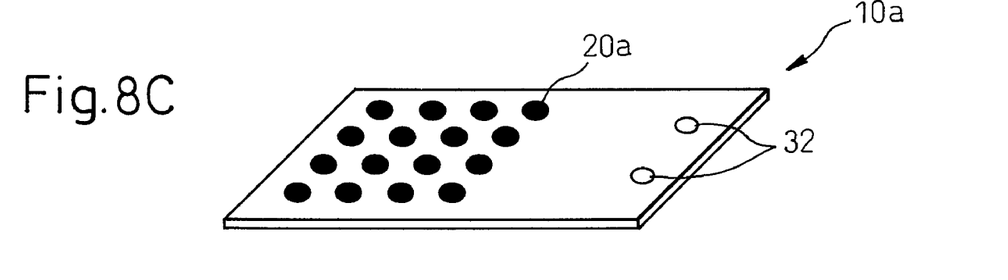
FIG. 8C is a perspective view showing a calibrating device on which a positioning benchmark is formed.

Further, depending on the target of calibration, the relative positional relationship between the characteristic portion on the calibrating device and the calibration target must be understood with a high degree of precision beforehand. For example, as shown in FIG. 8A, in the case of calibrating the internal parameters, etc., of the camera in the camera system 110 including the camera 40, the characteristic portion 20a should be arranged so that the relative positions and the relative postures between the characteristic portion 20a on the calibrating device 10a and a support 111 to which the camera 40 is attached have designated values. Also, as shown in FIG. 8B, in the case of calibrating the mechanical parameters of the robot 120, the characteristic portion 20a should be arranged so that the relative positions and the relative postures between the characteristic portion 20a on the calibrating device 10a and a robot base 121 have designated values. In these cases, generally, as shown in FIG. 8C, a benchmark point for positioning (hereinafter referred to as positioning benchmark 32) is provided on the calibrating device 10a, and the calibrating device 10a is arranged on the support 111 of the camera system 110 or the robot base 121 of robot 120 using the positioning benchmark 32. The specific means for the positioning benchmark 32 can be an abutting surface, fitting, positioning pin, positioning pin hole, etc., and these are mainly processed using a machine tool. If the characteristic portion on the calibrating device is processed using an apparatus separate from the apparatus for processing the positioning benchmark 32, such as a printing apparatus, there are problems such that the relative position accuracy between the characteristic portion and the positioning benchmark 32 decreases, the processing cost increases, and the like. According to the calibrating device 10a of the present invention, the characteristic portion 20a of the calibrating device 10a and the positioning benchmark 32 can be formed by machining. Further, when the characteristic portion 20a and the positioning benchmark 32 are holes having the same shape, they can be formed simultaneously using the same machine tool, achieving the high-precision positional relationship between the characteristic portion 20a and the positioning benchmark 32.

Figure 3:
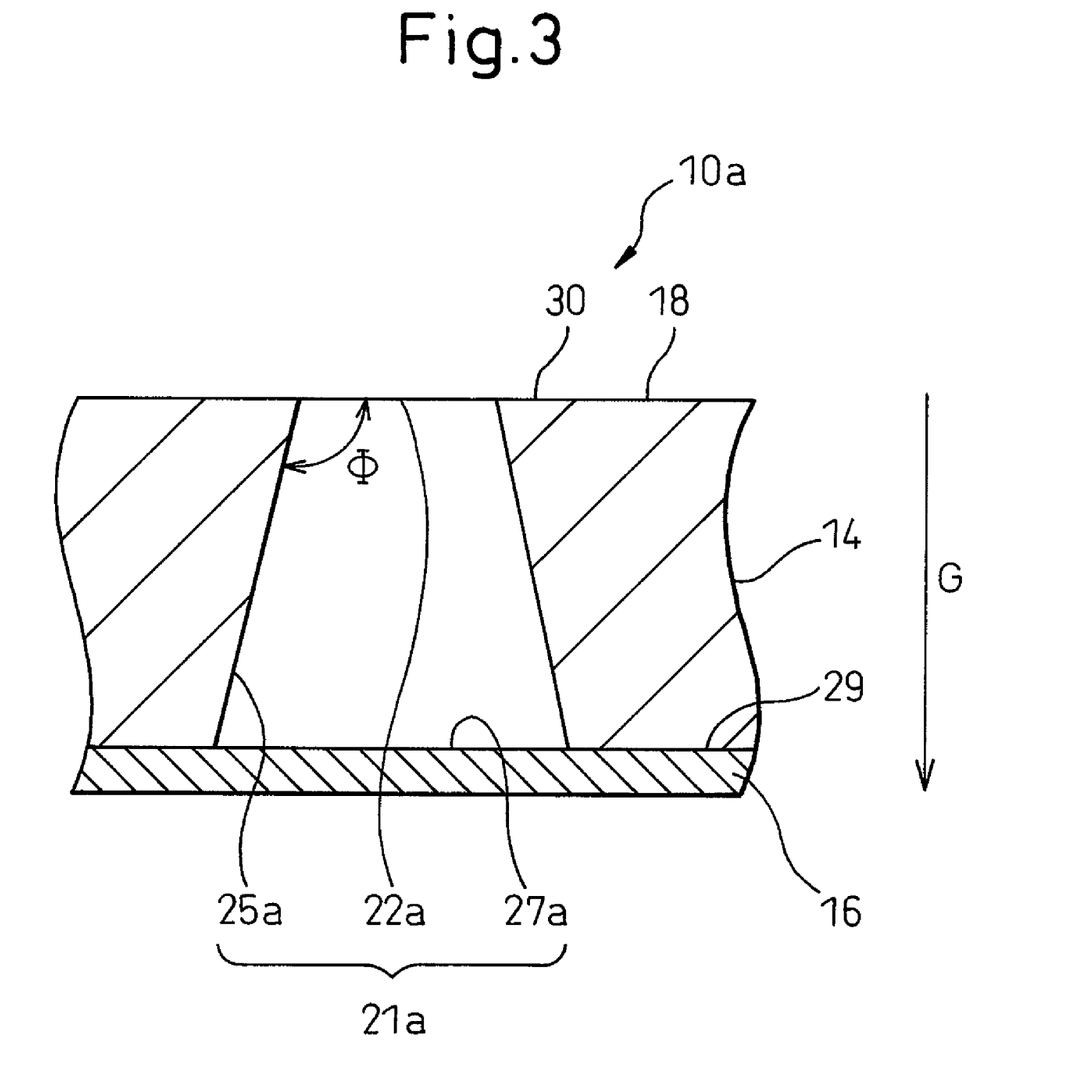
FIG. 3 is a cross sectional view showing another example of the characteristic portion on the calibrating device.

Next, another example of the characteristic portion 20a will be explained using FIG. 3. FIG. 3 is a cross sectional view showing a characteristic portion 21a, which is another example of the characteristic portion 20a, on the calibrating device 10a, along the line I-I of FIG. 1A. The characteristic portion 20a and the characteristic portion 21a are different in terms of the shape of the side surface and the area of the bottom surface.

The side surface 24a of the characteristic portion 20a shown in FIG. 1B is formed so as to extend in the direction perpendicular to the flat portion 30 of the upper surface 18 of the plate 14. The side surface 25a of the characteristic portion 21a shown in FIG. 3 is formed so that the angle $\Phi$ between the side surface 25a and the upper surface of the plate 14 (hereinafter referred to as an open angle $\Phi$ of the opening) is an obtuse angle. Namely, the characteristic portion 21a is shaped so that the opening area in the cross section parallel to the flat portion 30 of the upper surface 18 increases from the upper surface 18 toward the bottom surface 27a (in the direction G in FIG. 3). Accordingly, as shown in FIG. 3, the longitudinal section of the characteristic portion 21a has a trapezoidal shape, and the area of the bottom surface 27a is larger than the area of the opening 22a.

As shown in FIG. 2B, the image measurement system 100 using the calibrating device according to the present invention detects the characteristic portion based on the brilliance. Therefore, the larger the difference between the brilliance of the upper surface 18 of the plate 14 and the brilliance of the characteristic portion, the clearer the outline of the characteristic portion, leading to the precise detection of the characteristic portion by the image measurement system 100. Compared to the bottom surface 26a of the characteristic portion 20a shown in FIG. 1B, the bottom surface 27a of the characteristic portion 21a is enlarged, and thus, when the camera 40 images the characteristic portion 21a, the area of the bottom surface 27a imaged through the opening 22a of the characteristic portion 21a by the camera 40 increases. Namely, in the measurement image, the area having a larger brilliance difference compared to the brilliance of the upper surface of the plate 14 (the black portion in FIG. 2A) increases within the range outlined by the opening 22a of the characteristic portion 21a. In other words, the outline of the characteristic portion 21a is made clearer, and thus, the image measurement system 100 can detect the characteristic portion 21a more precisely.

(Second Embodiment)

Figure 4A:
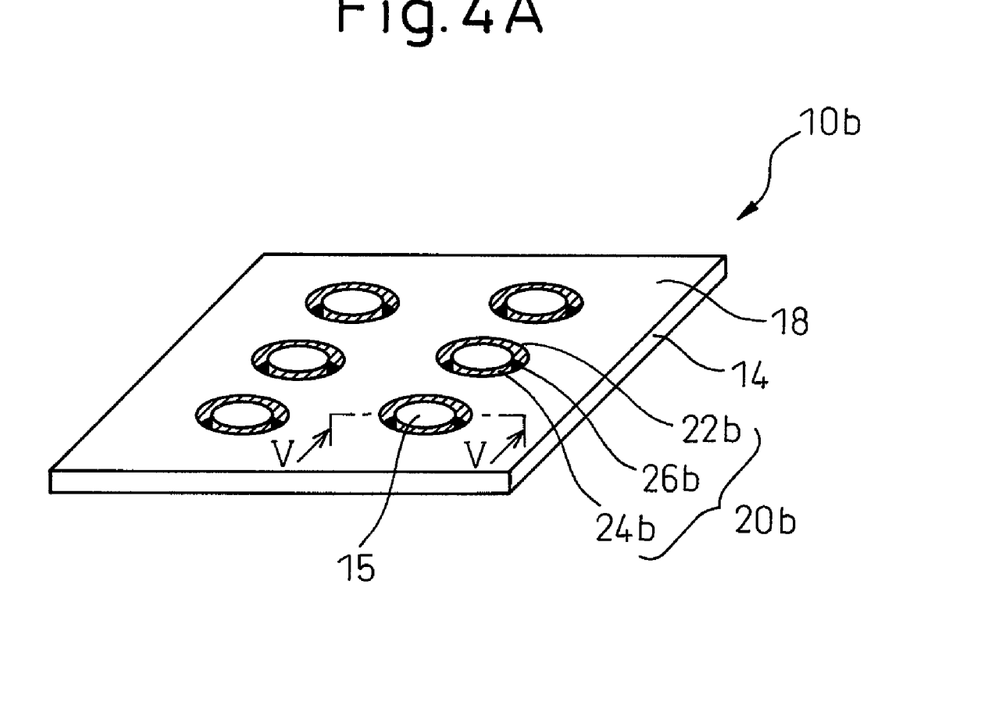
FIG. 4A is a perspective view showing an example of the calibrating device according to the second embodiment.
Figure 4B:
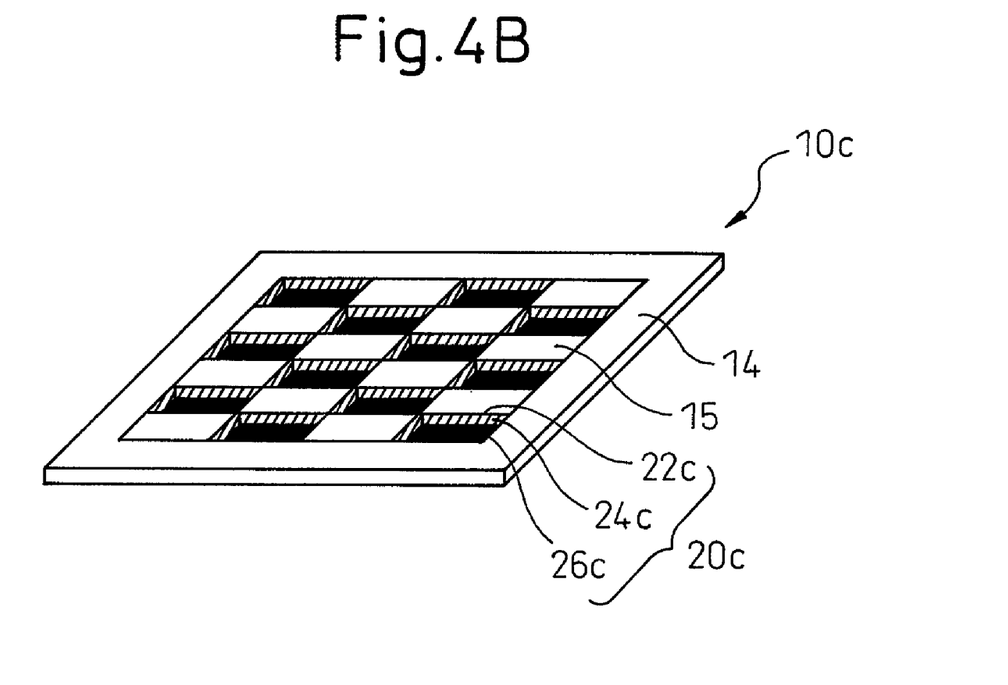
FIG. 4B is a perspective view showing another example of the calibrating device according to the second embodiment.
Figure 5A:
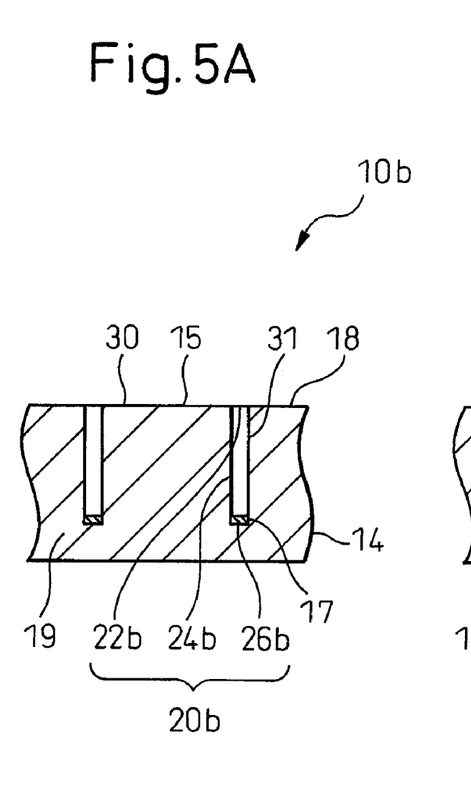
FIG. 5A is a cross sectional view along the line V-V of FIG. 4A showing the characteristic portion on the calibrating device shown in FIG. 4A.
Figure 5B:
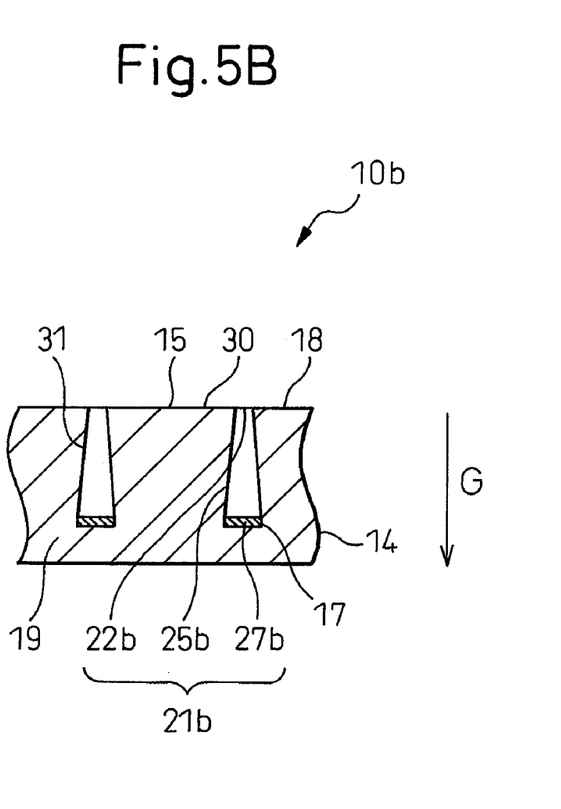
FIG. 5B is a cross sectional view showing another example of the characteristic portion.

FIG. 4A is a perspective view showing an example of the calibrating device according to the second embodiment. FIG. 4B is a perspective view of another example of the calibrating device according to the second embodiment. FIG. 5A is a cross sectional view along the line V-V of FIG. 4A and shows the characteristic portion 20b of the calibrating device 10b shown in FIG. 4A. FIG. 5B is a cross sectional view along the line V-V of FIG. 4A and shows the characteristic portion 21b which is another example of the characteristic portion 20b.

The second embodiment will be explained using FIG. 4A to FIG. 5B. The calibrating devices 10b and 10c according to the second embodiment are different from the calibrating device 10a according to the first embodiment in terms of the method of forming the recess.

First, the characteristic portion of the calibrating device according to the second embodiment will be explained. The plate 14 of the calibrating device 10b shown in FIG. 4A is provided thereon with a plurality of characteristic portions 20b having annular openings 22b. Therefore, the calibrating device 10b is provided on the upper surface 18 of plate 14 with portions separated by the characteristic portions 20b and unconnected to the surroundings (non-recessed portions 15, the white portions in the rings in FIG. 4A).

On the other hand, the plate 14 of the calibrating device 10c shown in FIG. 4B is provided with a plurality of characteristic portions 20c having rectangular openings 22c to thereby form a checkered-pattern. Therefore, the calibrating device 10c has non-recessed portions 15 which are unconnected to the surroundings, similar to the calibrating device 10b in FIG. 4A. Because the calibrating devices 10b and 10c have non-recessed portions 15, if the characteristic portions 20b and 20c are respectively formed by through holes on the plate 14, similar to the calibrating device 10a according to the first embodiment, the non-recessed portions 15 are separated from the plate 14, and thus, the calibrating devices 10b and 10c cannot secure the non-recessed portions 15 accurately.

Therefore, as shown in FIG. 5A, the characteristic portion 20b is composed by a bottomed recess 31 formed in the plate 14, and a low reflective layer 17 which is a separate member from the plate 14 and arranged in the bottomed recess 31.

Then, the opening of the bottomed recess 31 defines an opening 22b of the characteristic portion 20b, and the inner peripheral surface of the bottomed recess 31 defines a side surface 24b of the characteristic portion 20b, and the surface of the low reflective layer 17 defines the bottom surface 26b of the characteristic portion 20b. In the characteristic portion 20b, the side surface 24b of the characteristic portion 20b extends in a direction orthogonal to the flat region 30 of the upper surface 18 of the plate 14, similar to the characteristic portion 20a in FIG. 1. Namely, the side surface 24b is formed to be perpendicular to the upper surface 18. Also, the bottom surface 26b of the characteristic portion 20b is formed by a low reflective layer 17 (bottom member) filled with a low reflective material having a reflectance lower than the reflectance of the upper surface of the plate 14. Because of the low reflective layer 17, the reflectance of the bottom surface 26b of the characteristic portion 20b is lower than the optical reflectance of the upper surface 18 of the plate 14. Further, in the second embodiment, similar to the first embodiment, black sponge which is different from the material for the plate 14 is used as a low reflective material. Accordingly, the bottom surface 26b is formed by the low reflective layer 17 filled with black sponge.

The characteristic portion 20b is formed without penetrating the plate 14, and thus, the non-recessed portions 15 are connected at the bottom 19 of the plate 14. Accordingly, the calibrating device 10b can be accurately secured to the non-recessed portion 15. The same is true for the calibrating device 10c, and the characteristic portion 20c is formed without penetrating the plate 14 and leaving the bottom of the plate 14 remained. Because the non-recessed portions 15 are connected to the bottom of the plate 14, the calibrating device 10c can secure the non-recessed portions 15 accurately.

Next, a characteristic portion 21b, which is another example of the characteristic portion 20b will be explained using FIG. 5B. The calibrating device 10b according to the second embodiment shown in FIG. 5A is formed so that the side surface 24b of the characteristic portion 20b extends in a direction perpendicular to the flat portion 30 of the upper surface 18 of the plate 14. On the other hand, the characteristic portion 21b of the calibrating device 10b shown in FIG. 5B is formed so that the side surface 25b is inclined with respect to the flat portion 30 of the upper surface 18 of the plate 14. Namely, the characteristic portion 21b is shaped so that the opening area in the cross section parallel to the flat portion 30 of the upper surface 18 increases from the upper surface 18 toward the bottom surface 27b (in the direction G in FIG. 5B). Accordingly, the longitudinal section of the characteristic portion 21b has a trapezoidal shape, and the area of the bottom surface 27b is larger than the opening area of the opening 22b. By forming the characteristic portion 21b as above, similar to the characteristic portion 21a shown in FIG. 3, the area of the bottom surface 27b imaged by the camera 40 increases within the range outlined by the opening 22b of the characteristic portion 21b recorded in the measurement image. Accordingly, the image measurement system 100 can detect the characteristic portion 21b more precisely.

Further, as mentioned above, the area of the bottom surface 27b of the characteristic portion 21b is larger than the area of the opening 22b of the characteristic portion 21b. Therefore, the low reflective material should be a deformable material so that the low reflective layer 17 made of the low reflective material can be inserted from the opening 22b. The bottom surface 27b of the characteristic portion 21b is formed by the low reflective layer 17 filled with black sponge, similar to the characteristic portion 20b shown in FIG. 5A.

(Third Embodiment)

Figures 6A, 6B:
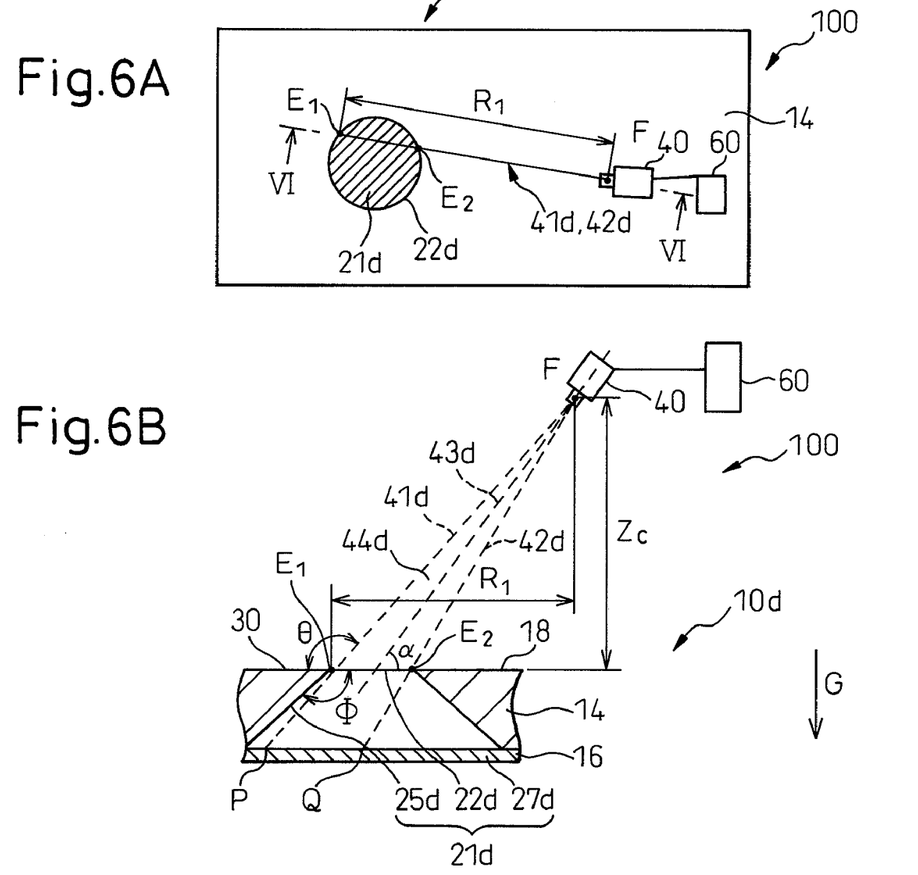
FIG. 6A is a plan view of an image measurement system showing a positional relationship between the calibrating device according to the third embodiment and the camera imaging the calibrating device.
FIG. 6B is a cross sectional view along the line VI-VI of FIG. 6A.
Figure 6C:
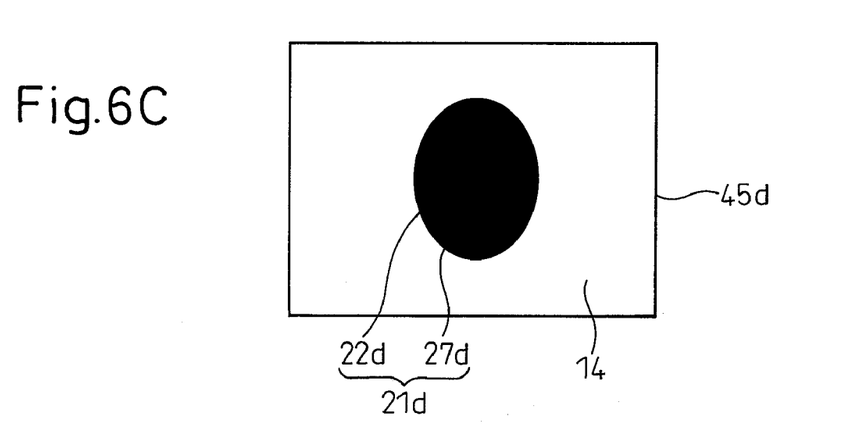
FIG. 6C is a view showing a part of the measurement image of the calibrating device according to the third embodiment imaged by the camera.

FIG. 6A is a plan view of the image measurement system 100 showing a positional relationship between a calibrating device 10d according to the third embodiment and the camera 40. FIG. 6B is a cross sectional view along the line VI-VI of FIG. 6A. FIG. 6C is a view showing a part of a measurement image 45d of the calibrating device 10d imaged by the camera 40. The third embodiment will be explained using FIG. 6A to FIG. 6C.

The calibrating device 10d according to the third embodiment has a feature that the shape and size of the characteristic portion 21d of the calibrating device 10d is set so as to not image the side surface 25d of the characteristic portion 21d when the camera 40 images the characteristic portion 21d, by the angle of the optical axis of the camera 40 predetermined with respect to the characteristic portion 21d for calibration in image measurement system 100. The structure of the characteristic portion 21d is the same as the characteristic portion 21a of the calibrating device 10a according to the first embodiment shown in FIG. 3, and thus, explanation thereof is omitted.

As shown in FIG. 2B, depending on the relative positions between the position of the camera and the calibrating device, both the side surface and the bottom surface of the recess may be recorded in the measurement image picked-up by the camera. Therefore, the image measurement system processes the measurement image based on two different brilliances to detect the characteristic portion. It is possible for the image measurement system to process based on two different brilliances. However, the processing based on single brilliance can make the algorithm and the program simple. If the algorithm and the program are simple, the time necessary for the image measurement system to detect the characteristic portion can be shortened. Therefore, the characteristic portion 21d of the calibrating device 10d according to the third embodiment is formed to have a size and shape by which the side surface 25d is not imaged by the camera 40. Therefore, a single brilliance of the bottom surface 27d is recorded in the measurement image 45d picked-up by the camera 40.

A method for determining the size of the characteristic portion 21d so that the side surface 25d of the characteristic portion 21d is not imaged by the camera 40 will be explained. As shown in FIG. 6A and FIG. 6B, the camera 40 images the characteristic portion 21d from obliquely above, and is located so that the camera 40 images the inside of the characteristic portion 21d through the opening 22d. As shown in FIG. 6B, the camera 40 images an inside of the characteristic portion 21d included in the range surrounded by the distal side line-of-sight 41d and the proximal side line-of-sight 42d (inner-characteristic-portion imaging range 44d). Note that, the distal side line-of-sight 41d is defined by a line-of-sight of the camera 40 connecting the position F of the camera 40 and the point E1 on the opening 22d far from the camera 40 and an extension of the line, and is indicated by the dashed line FP in FIG. 6B. The proximal side line-of-sight 42d is defined by the line-of-sight of the camera 40 connecting the position F of the camera 40 and the point E2 on the opening 22d closer to the camera 40 than the point E1 and an extension of the line, and is indicated by the dashed line FQ in FIG. 6B. Also, as shown in FIG. 6A, the point E2 is a position where the horizontal component of the distal side line-of-sight 41d connecting the point E1 on the opening 22d and the position F of the camera 40 intersects with the opening 22d. If the side surface 25d of the characteristic portion 21d is not included in the inner-characteristic-portion imaging range 44d, but only the bottom surface 27d is included therein, the camera 40 does not image the side surface 25d, but images only the bottom surface 27d.

The shape of the characteristic portion 21d of the calibrating device 10d will be explained. As shown in FIG. 6B, the characteristic portion 21d is shaped so that the opening area in the cross section parallel to the flat portion 30 of the upper surface 18 increases from the upper surface 18 toward the bottom surface 27d (in the direction G in FIG. 6B). Also, the angle $\Phi$ between the upper surface 18 and the side surface 25d is determined as follows. At first, the angle $\Phi$ between the distal side line-of-sight 41d and the upper surface 18 of the plate 14 is obtained at all points on the opening 22d of the characteristic portion 21d, and the maximum value of the angle $\theta$, $\theta$ max, is obtained. The maximum value $\theta$ max can be obtained from the point Emax on the opening 22d farthest from the position F of the camera 40. If the side surface 25d is formed so that the angle $\Phi$ between the upper surface 18 and the side surface 25d is the maximum value $\theta$ max or larger, the side surface 25d is not included in the inner-characteristic-portion imaging range 44d. Accordingly, the side surface 25d is not imaged by the camera 40, and only the bottom surface 27d is imaged. Namely, as shown in FIG. 6C, in the measurement image 45d picked-up by the camera 40, only a single brilliance indicating the bottom surface 27d is recorded within the ranged outlined by the opening 22d of the characteristic portion 21d.

The open angle $\Phi$ of the opening shown in FIG. 6B is obtained by the formula 1:

$$\Phi \geq \theta \max \quad \text{(formula 1)}$$

with the proviso that the $\theta$ max is obtained by the formula 2:

$$\theta\max = 180 \deg - \tan^{-1}(Zc/R\max) \quad \text{(formula 2)}$$

Zc is a variable for each image system and is the height from the upper surface 18 of the plate 14 to the position F of the camera 40. Rmax is the length of a horizontal component of the line segment connecting the point Emax, which is the point on the opening 22d of the characteristic portion 21d and located at the farthest position from the camera 40, and the position F of the camera 40. When the shape of the opening 22d is a circle, the point Emax is located on the line which matches the horizontal component of the line connecting the position F of the camera 40 and the center of the opening 22d.

Also, the angle $\alpha$ formed between the optical axis 43d of the camera 40 and the upper surface 18 of the plate 14, the opening width of the opening 22d of the characteristic portion 21d, and the intersection of the optical axis 43d and the opening 22d can be used to obtain the maximum value $\theta$ max of the angle $\theta$, and thus, obtain the open angle $\Phi$ of the opening.

By using the calibrating device 10d according to the third embodiment, the single brilliance indicating the bottom surface 27d is recorded in the measurement image 45d. Accordingly, the image measurement system 100 can perform the image processing by a simple algorithm or program, and the time necessary for detecting the characteristic portion 21d can be shortened.

Further, although the camera 40 is located obliquely above the characteristic portion 21d in FIG. 6A and FIG. 6B, the camera 40 can be located just above the characteristic portion 21d. The longitudinal section of the characteristic portion 21d has a trapezoidal shape, and the side surface 25d is inclined to extend outward from the opening 22d. Therefore, even if the camera 40 images the characteristic portion 21d from just above, the brilliance indicating the side surface 25d is not recorded in the measurement image 45d, and only the brilliance indicating the bottom surface 27d is recorded with in the range outlined by the opening 22d. Accordingly, even if the camera 40 is located just above, the same effect which is obtained in the above mentioned case where the camera 40 is located obliquely above, can be obtained.

(Fourth Embodiment)

Figure 7A:
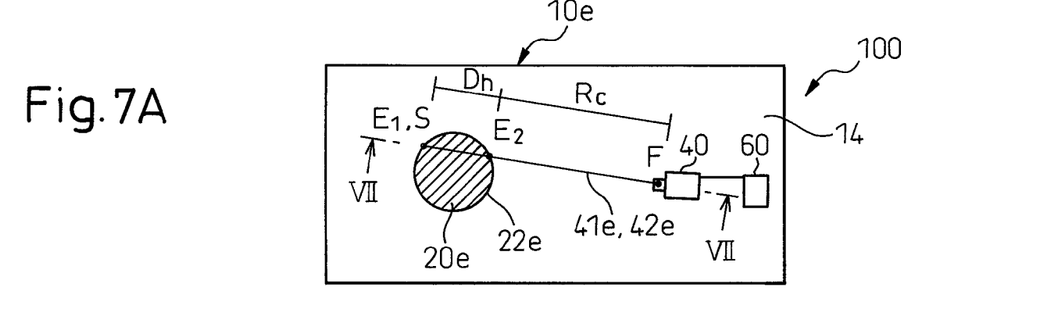
FIG. 7A is a plan view of an image measurement system showing a positional relationship between the calibrating device according to the fourth embodiment and the camera imaging the calibrating device.
Figure 7B:
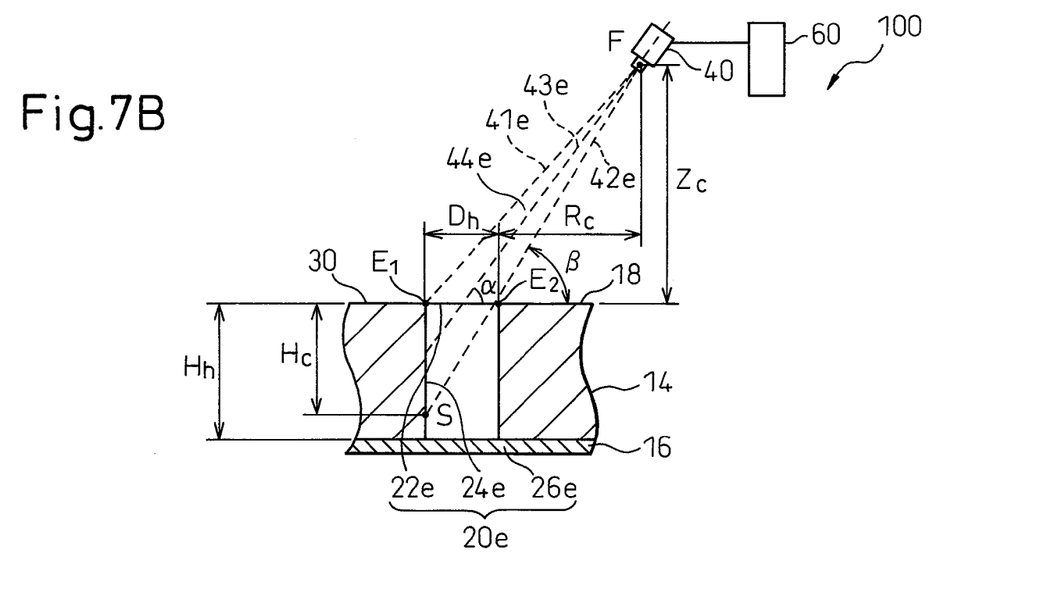
FIG. 7B is a cross sectional view along the line VII-VII of FIG. 7A.
Figure 7C:
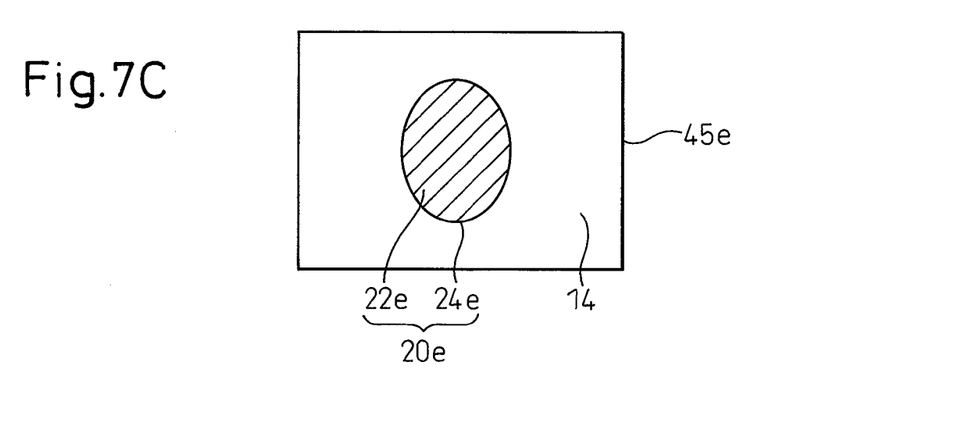
FIG. 7C is a view showing the measurement image of the calibrating device according to the fourth embodiment imaged by the camera.

FIG. 7A is a plan view of the image measurement system 100 showing a positional relationship between the calibrating device 10e according to the fourth embodiment and the camera 40. FIG. 7B is a cross sectional view along the line VII-VII of FIG. 7A. FIG. 7C is a view showing a part of the measurement image 45e of the calibrating device 10e imaged by the camera 40. The fourth embodiment will be explained using FIG. 7A to FIG. 7C.

The calibrating device 10e according to the fourth embodiment has a feature that the shape and size of the characteristic portion 20e of the calibrating device 10e is set so as not to image the bottom surface 26e of the characteristic portion 20e when the camera 40 images the characteristic portion 20e, by the angle of the optical axis of the camera 40 predetermined with respect to the characteristic portion 20e for calibration in image measurement system 100. The structure of the characteristic portion 20e is the same as the characteristic portion 20a of the calibrating device 10a according to the first embodiment shown in FIG. 1B, and thus, explanation thereof is omitted.

As in the characteristic portion 20a according to the first embodiment, generally, the image measurement system detects the characteristic portion based on two different brilliances. Also, as in characteristic portion 21d according to the third embodiment, when the side surface is inclined, it is possible that the side surface is not imaged by the camera. However, the larger the inclined angle θ between the distal side line-of-sight and the upper surface of the plate, the larger the open angle Φ of the opening, making the processing of the characteristic portion difficult.

Thus, the characteristic portion 20e of the calibrating device 10e according to the fourth embodiment is formed so that the side surface 24e thereof extends in a direction orthogonal to the flat portion 30 of the upper surface 18 of the plate 14, in other words, is formed to be perpendicular to the upper surface 18, to thereby make the processing of the characteristic portion 20e easier. Furthermore, the characteristic portion 20e is formed by determining a sufficient depth with which the bottom surface 26e is not imaged by the camera 40. Compared to the bottom surface 26e, the brilliance of the side surface 24e has smaller difference from the brilliance of the upper surface of the plate 14. However, because only a single brilliance is recorded in the measurement image, the image measurement system 100 can perform the image processing by a simple algorithm or program, and the time necessary for detecting the characteristic portion 20e can be shortened.

A method for determining the size of the characteristic portion 20e so that the bottom surface 26e is not imaged by the camera 40 will be explained. As shown in FIG. 7A and FIG. 7B, the camera 40 images the characteristic portion 20e from obliquely above, and the camera 40 images the inside of the characteristic portion 20e through the opening 22e of the characteristic portion 20e. Similar to the inner-characteristic-portion imaging range 44d explained in the third embodiment, as shown in FIG. 7B, the camera 40 images the characteristic portion 20e in the range surrounded by the distal side line-of-sight 41e and the proximal side line-of-sight 42e (inner-characteristic-portion imaging range 44e). The distal side line-of-sight 41e is a dashed line FE1 shown in FIG. 7B which connects the position F of the camera 40 and the point E1 on the opening 22e far from the camera 40. The proximal side line-of-sight 42e is defined by the line-of-sight of the camera 40 connecting the position F of the camera 40 and the point E2 on the opening 22e closer to the camera 40 than the point E1 and an extension of the line, and is indicated by the dashed line FS in FIG. 7B. As shown in FIG. 7A, the point E2 is the position where a horizontal component of the distal side line-of-sight 41e connecting the point E1 on the opening 22e and the position F of the camera 40 intersects with the opening 22e.

When the bottom surface 26e of the characteristic portion 20e is not included in the inner-characteristic-portion imaging range 44e, and only the side surface 24e thereof is included, the camera 40 images only the side surface 24e through the opening 22e of the characteristic portion 20e. The depth Hh of the characteristic portion 20e satisfying the condition that only the side surface 24e is included can be obtained by the following procedures. First, the ratio G of the height Zc of the camera 40 from the upper surface of the plate 14 to the horizontal component Rc of the line segment connecting the position F of the camera 40 and the point E2 is obtained. Then, the lower limit Hc of the depth that the bottom surface 26e is not imaged by the camera 40 is obtained from the distance Dh between the point E1 and the point E2 using the ratio G so that the ratio therebetween is the same as the ratio G. Finally, the lower limit depth Hc is obtained at every point on the opening 22e of the characteristic portion 20e, and the depth Hh of the characteristic portion 20e is determined to be at least the maximum value of the obtained lower limit depth Hc, Hcmax. Namely, the depth Hh of the characteristic portion 20e is obtained by formula 3:

$$Hh \geq Hcmax \tag{formula 3}$$

with the proviso that Hcmax is the maximum value of the lower limit depth Hc obtained by formula 4, $$Hc = (Zc/Rc) \times Dh \tag{formula 4}$$

Hh is the depth of the characteristic portion 20e. Zc is the height from the upper surface of the plate 14 to the camera 40. Rc is the horizontal component of the line segment connecting the position F of the camera 40 and the point E2 on the opening 22e. Dh is the distance between the point E1 and the point E2. Also, if the shape of the opening 22e is a circle, the lower limit depth Hc has the maximum value Hcmax when the point E1 and the point E2 are on the line which matches the horizontal component of the line connecting the position F of the camera 40 and the center of the opening 22e.

Further, the angle α formed by the optical axis 43e of the camera 40 and the upper surface 18 of the plate 14, the opening width Dh of the opening 22e of the characteristic portion 20e, and the intersection of the optical axis 43e and the opening 22e can be used to obtain the angle β formed by the proximal side line-of-sight 42e and the upper surface 18 of the plate 14, and to thereby obtain the maximum value Hcmax of the lower limit depth Hc by using tan β for (Zc/Rc) in the formula 3.

Accordingly, by determining the depth Hh of the characteristic portion 20e, as show in FIG. 7C, only the brilliance indicating the side surface 24e is recorded within the range outlined by the opening 22e of the characteristic portion 20e in the measurement image 45e picked-up by the camera 40. Therefore, the image measurement system 100 can detect the characteristic portion 20e by image processing only the single brilliance of the side surface 24e. Similar to the third embodiment, the program for image processing can be easier and the time necessary for the image measurement system 100 to detect the characteristic portion 20e can be shortened. Also, because the side surface 24e of the characteristic portion 20e is formed to extend in the direction perpendicular to the flat portion 30 of the upper surface 18 of the plate 14, the characteristic portion 20e can be easily processed compared to the case where the side surface is inclined. Therefore, the calibrating device 10e can be produced at a lower cost.

The embodiments of the present invention have been explained above with reference to the attached drawings. The present invention is not limited to the above embodiments, but can be carried out with various modifications within the range not deviated from the essential features of the present invention. For example, in the embodiments, the sheet made of a low reflective material is produced by cutting a black sponge in a sheet form. However, the sheet can be produced by cutting a black plastic plate or a black-painted metal plate, which are low reflective materials. Also, the sheet can be produced by a non-reflective material. Further, in order to increase the stability of the measurement, it is possible to form the recess on the plate, which serves as a characteristic portion, by machine processing, and thereafter, carry out the surface treatment to make the specular upper surface or the processed portion of the plate diffusely reflective. Similarly, in the second embodiment, the black sponge which is the low reflective material is arranged in the bottomed recess, but black plastic, etc., which is a low reflective material can be arranged in the bottomed recess. Also, a non-reflective material can be arranged in the bottomed recess. Further, the bottom surface can be processed to make the bottom surface of the bottomed recess low reflective. The calibrating device according to the present invention is not limited to a calibrating device for calibration. By providing the characteristic portion in the form of a recess onto a workpiece which is imaged by the camera, the position of the workpiece can be measured stably and precisely.

According to the calibrating device of the present invention, the bottom surface of the characteristic portion in the form of a recess has a low reflectance, and thus, the light incident to the characteristic portion is barely reflected toward the outside of the characteristic portion. Because the amount of light reflected by the bottom surface decreases, the brilliance of the bottom surface becomes lower than the brilliance of the upper surface of the main body. Also, because the bottom surface barely reflects light, the amount of light reflected by the side surface of the characteristic portion toward the outside also decreases. Therefore, the brilliance of the characteristic portion becomes lower than the brilliance of the upper surface of the main body. Further, because the characteristic portion is in the form of a recess, except for the case that the light is incident from the direction perpendicular to the main body, the side surface of the characteristic portion serves as an impediment, and thus, no light is directly incident on the bottom surface. Therefore, it is rare that the brilliance of the bottom increases due to the glare generated by the direct light. In this way, the characteristic portion has a structure which barely reflects light, and the low brilliance of the characteristic portion can be maintained. Therefore, the image measurement system can stably detect the characteristic portion independent of the illumination conditions. If a paint is used as in the prior arts, the outline may be indefinite because of the reflection of light. However, in the present invention, the characteristic portion is detected by the difference of the brilliances, and thus, the outline of the characteristic portion cannot be indefinite because of the reflection. Accordingly, the image measurement system can precisely detect the characteristic portion. Also, unlike the prior arts, the paint is not used, and thus, there is no restriction in using the calibrating device, and the handling become easier. Furthermore, the characteristic portion can be formed easily and precisely by engraving the upper surface of the main body by machining.

If the characteristic portion is formed by a through hole formed in the main body and a closing member, the calibrating device provided with the characteristic portion can be produced easily. If the characteristic portion is a through hole, a separate closing member which does not require any specific shaping processing can be used, and coloring of each characteristic portion using paint is not required. Therefore, the time for producing the calibrating device can be shortened, and the calibrating device can be produced at a lower cost.

If the characteristic portion is provided with a bottomed recess and a bottom member arranged in the bottomed recess, and the bottom member arranged in the bottomed recess defines a bottom surface, the characteristic portion having a bottom surface whose reflectance is lower than the reflectance of the upper surface of the main body can be easily produced. Also, the bottomed recess is formed by engraving the upper surface of the main body, leaving the bottom part of the main body remained. Therefore, even in the case that the characteristic portion is annular or has a checkered pattern, and the upper surface of the main body includes a portion separated by the characteristic portion and unconnected to the surroundings (hereinafter referred to as a non-recessed portion), the non-recessed portion is connected to the surroundings by the bottom portion of the main body, and thus, the calibrating device can maintain the shape and the position of the non-recessed portion.

If the side surface of the characteristic portion extends in the direction perpendicular to the flat portion of the upper surface, the characteristic portion can be more easily formed, compared to the case that the side surface of the characteristic portion is inclined. Thus, the calibrating device can be produced at a lower cost.

Further, as mentioned above, in the measurement image obtained by imaging the calibrating device according to the present invention by the camera, the side surface and the bottom surface of the characteristic portion are recorded within the range outlined by the opening edge of the characteristic portion. If the characteristic portion is shaped so that the opening area increases from the upper surface toward the bottom surface, when the camera images the characteristic portion, the area of the bottom surface imaged through the opening edge of the characteristic portion increases. Namely, in the measurement image, the area whose brilliance has a larger difference from the brilliance of the upper surface of the main body increases within the range outlined by the opening edge of the characteristic portion. The larger the difference between the brilliance of the characteristic portion and the brilliance of the upper surface of the main body, the clearer the outline of the characteristic portion, and thus, the image measurement system can detect the characteristic portion more precisely.

If the image measurement system is provided with the calibrating device according to the present invention, the characteristic portion provided on the calibrating device can be stably measured independent of the illumination conditions.

If the side surface is not imaged and only the bottom surface is recorded in the measurement image when the camera images the characteristic portion, by the image measurement system according to the present invention, only a single brilliance indicating the bottom surface is recorded in the measurement image, and thus, the program for processing the measurement image becomes easier, and also, the time necessary for the image measurement system to detect the characteristic portion can be shortened.

If the bottom surface is not imaged and only the side surface is recorded in the measurement image when the camera images the characteristic portion, by the image measurement system according to the present invention, only a single brilliance indicating the side surface is recorded in the measurement image, and thus, the program for processing the measurement image becomes easier, and also, the time necessary for the image measurement system to detect the characteristic portion can be shortened.

The present invention has been explained using typical embodiments. However, a person skilled in the art will understand that the above-mentioned modification and various other modifications, omission, and addition can be carried out without deviating from the scope of the present invention.

The invention claimed is:

1. A calibrating device for calibration in an image measurement system, comprising:
 a main body having an upper surface; and
 a characteristic portion which serves as a benchmark for calibration and is in a form of a recess formed in the upper surface of the main body;
 wherein the characteristic portion comprises a side surface extending in a direction crossing the upper surface, and a bottom surface extending in a direction crossing the side surface; and
 wherein the bottom surface has an optical reflectance lower than an optical reflectance of the upper surface in relation to light identical to each other,
 wherein the main body comprises a lower surface opposite to the upper surface; wherein the characteristic portion comprises a through hole formed in the main body to open at both the upper surface and the lower surface, and a closing member separate from the main body and attached to the lower surface to close one of openings of the through hole; and wherein an inner peripheral surface of the through hole defines the side surface and a surface of the closing member defines the bottom surface.

2. The calibrating device according to claim 1, wherein the upper surface of the main body is provided with a flat portion at least in a region adjacent to the characteristic portion; wherein the side surface of the characteristic portion extends in a direction perpendicular to the flat portion of the upper surface; and wherein the bottom surface of the characteristic portion extends in a direction perpendicular to the side surface.

3. The calibrating device according to claim 1, wherein the upper surface of the main body is provided with a flat portion at least in a region adjacent to the characteristic portion; and wherein the characteristic portion is shaped so that an opening area in a cross section parallel to the flat portion of the upper surface increases from the upper surface toward the bottom surface.

4. An image measurement system comprising:
 a camera; and
 a calibrating device, according to claim 1, for calibration imaged by the camera.

5. The image measurement system according to claim 4, wherein a shape and size of the characteristic portion of the calibrating device, and an angle of an optical axis of the camera predetermined with respect to the characteristic portion for calibration, are set so as to not image the side surface when the camera images the characteristic portion.

6. The image measurement system according to claim 4, wherein a shape and size of the characteristic portion of the calibrating device, and an angle of an optical axis of the camera predetermined with respect to the characteristic portion for calibration, are set so as to not image the bottom surface when the camera images the characteristic portion.

* * * * *